Patented June 30, 1953

2,643,969

UNITED STATES PATENT OFFICE 2,643,969

DIAPER

Thomas J. Mahon, Long Island City, N. Y., assignor to Homemakers' Products Corporation, New York, N. Y., a corporation of New York No Drawing. Application April 17, 1947, Serial No. 742,195

1 Claim. (Cl. 167—84)

This invention relates to preserving and disinfecting means and to textile materials treated by the application of such means. It has particular relation to the use of diapers as a vehicle for said preserving and disinfecting means in order to affect bacteria, specifically *Bacterium ammoniagenes*. Such bacteria are otherwise inaccessible at the point of emission of the urine to preserving and disinfecting means for sustained inhibition of bacterial growth.

It has been known that "diaper rash" is a dermatitis caused by free ammonia in the wet diaper in situ only, formed by bacterial decomposition of urinary urea into free ammonia by the action of *B. ammoniagenes*, a saprophytic gram positive bacillus. When the diaper is wet by urine, a good culture medium is furnished for bacterial growth. The growth of *B. ammoniagenes* is accompanied by abundant production of ammonia, which causes skin irritation and other symptoms of ammonia dermatitis. Therefore, it was concluded that the prevention and treatment of ammonia dermatitis requires inhibition of bacterial growth by the application of a non-volatile antiseptic substance in the diaper itself.

Dilute aqueous solutions of bichloride of mercury ($HgCl_2$), applied as a final rinse for the diapers, have been used as such antiseptic and it has been found that they prevent bacterial growth and ammonia formation. However, bichloride of mercury has various disadvantages. Apart from the fact that it is a strong poison for human beings, it has a corrosive action on metals, for example on golden rings, and it is difficult to insure its correct concentration. Boric acid has not proved sufficiently effective and other disinfectants also have disadvantages.

A perfect antiseptic to be used in the prevention and treatment of ammonia dermatitis must be first of all capable of safely preventing bacterial growth at low concentrations. Furthermore, such antiseptic should have no irritating effect on the human skin, and no adverse effect on the fibers forming the diapers. It should be sufficiently soluble in water in order to be applied as a rinse at a predetermined concentration.

The main object of this invention is to provide a composition for the treatment or impregnation of fibrous materials in order to prevent bacterial growth on the latter and in media coming in contact with said materials.

It is also an object of this invention to provide solutions for the treatment or impregnation of textile fabrics, particularly diapers, in order to inhibit the growth of *B. ammoniagenes* on said fabrics.

A further object of this invention is to provide a water-soluble composition of the above described type, which is odorless, non-irritating, non-volatile, non-corrosive and non-inflammable.

It is also an object of the present invention to provide a water-soluble impregnating composition which is easily and quickly absorbed from aqueous solutions by cotton fabrics, such as diapers, soaked therein.

Other objects and the advantages of the invention will be apparent from the following specification and the appended claim.

It has been found that compositions containing as an active ingredient para di-isobutyl cresoxy ethoxy di-methyl benzyl ammonia chloride meet with the above requirements and represent a safe and efficient bactericide in the prevention and treatment of ammonia dermatitis.

In contact tests with solutions of para di-isobutyl cresoxy ethoxy ethyl di-methyl benzyl ammonium chloride monohydrate, it has been found that such solutions show no irritation of the skin of children, infants and newborns. 96 children and infants and 122 newborn infants received patch tests soaked with a 1:5000 solution of the drug. The patch was a 1" square gauze which remained wet and in contact with the skin for 24 hours. No irritating effects on the skin were noted in any child, infant or newborn infant. The patch test was repeated on 100 infants and children in 10 days with no reaction.

The bactericidal action of the drug was tested in vitro on *B. ammoniagenes* and the results are shown in Tables I and II. The cup-plate method indicates inhibition up to 1:110,000. The tube method, which is more accurate, shows the bactericidal action up to 1:200,000.

TABLE I

*Cup-plate method of testing (Medium—extract agar)*

| Dilution of Drug [1] | Inhibition Zone, diameter in mm. beyond cup |
|---|---|
| 1:1000 | 14 mm. |
| 1:10,000 | 16 mm. |
| 1:20,000 | 11 mm. |
| 1:30,000 | 6 mm. |
| 1:40,000 | 10 mm. |
| 1:50,000 | 7 mm. |
| 1:70,000 | 7 mm. |
| 1:80,000 | 7 mm. |
| 1:90,000 | 7 mm. |
| 1:100,000 | 11 mm. |
| 1:110,000 | 11 mm. |
| 1:120,000 | 1 mm. |
| 1:130,000 | no inhibition. |

[1] Amount of drug solution tested per cup, 0.05 cc.

TABLE II

*Tube method (Medium—extract broth to which drug was added in varying concentration)*

[Incubation at 37° C., and at room temperature.]

| Dilution of Drug | Broth Culture at 37° C. | Broth Culture at Room Temp. |
|---|---|---|
| 1:50,000 | inhibited | inhibited |
| 1:100,000 | do | Do. |
| 1:110,000 | do | Do. |
| 1:120,000 | do | Do. |
| 1:130,000 | do | Do. |
| 1:140,000 | do | Do. |
| 1:150,000 | do | Do. |
| 1:160,000 | do | Do. |
| 1:180,000 | do | Do. |
| 1:200,000 | do | slight growth. |

In order to test the inhibition of ammonia formation, two diapers were soaked in a one quart 1:10,000 aqueous solution of para di-isobutyl cresoxy ethoxy ethyl di-methyl benzyl ammonium chloride monohydrate, wrung out and dried thoroughly. Sheets of heavy filter paper, somewhat smaller in area than the diaper, were soaked in filtered urine, placed on the two treated diapers and on two untreated diapers, and inoculated with 2 cc. of a heavy suspension of organisms in urine. Diapers and filter paper were folded together and incubated in a can at 37° C. No odor of $NH_3$ could be observed after 15 hours in the material treated with the drug solution, while abundant formation of $NH_3$ was observed in the untreated materials after 15 hours.

In carrying out the present invention; the para di-isobutyl cresoxy ethoxy ethyl di-methyl benzyl ammonium chloride monohydrate is preferably used for controlled dosage clinically in the form of tablets. The tablets preferably consist of a mixture of 1 part by weight of para di-isobutyl cresoxy ethoxy ethyl di-methyl benzyl ammonium chloride monohydrate,
4.5 parts by weight of sodium bicarbonate, and
1 part by weight of corn starch.

A tablet having approximately the above composition and weighing about 8.5 grains, dissolved in about 2 quarts of warm water, yields a solution of the drug of approximately 1:25,000. Up to 6 washed, clean diapers are placed in a basin and the solution poured over the same. The diapers are permitted to soak for 10 minutes, then wrung out, and dried.

It has been found that para di-isobutyl cresoxy ethoxy ethyl di-methyl benzyl ammonium chloride is absorbed from aqueous solutions by cellulosic fibers, such as diapers, almost quantitatively irrespective of the concentration of the solution in the amount of one half percent approximately of the dry weight of the diaper. It is, therefore, necessary to pour the solution over all diapers simultaneously. If diapers were introduced one at a time, all the para di-isobutyl cresoxy ethoxy ethyl di-methyl benzyl ammonium chloride monohydrate might be absorbed on the first diaper placed in the solution.

The clinical tests carried out with diapers treated in the above described manner, gave excellent results. The production of ammonia was inhibited; children suffering from ammonia dermatitis improved in a few days, and the dermatitis was cleared within 3–7 days. In resistant rashes the solution could be concentrated five times with no irritant effects on skin.

The drug should not be used with soap or synthetic detergents and is applied to the diapers as a final, clean rinse only.

The p-diisobutyl cresoxy ethoxy ethyl dimethyl benzyl ammonium chloride is prepared according to the method described in the U. S. Patent No. 2,115,250, of April 26, 1938, Herman A. Bruson.

It will be apparent from the above description that the present invention is not restricted to the specific details disclosed above. For example, the para-di-isobutyl cresoxy ethoxy ethyl di-methyl benzyl ammonium chloride monohydrate may be mixed with additional or other inert ingredients than those mentioned above to form tablets, and may also contain additional active ingredients. Furthermore, the solutions of the compositions according to the present invention may be used for the treatment of textile fabrics other than diapers, and the composition may be used in form of a solution of predetermined concentration instead of tablets. Furthermore, the para di-isobutyl cresoxy ethoxy ethyl di-methyl benzyl ammonium chloride monohydrate may be used as an active ingredient of an ointment in a bland ointment base and in oil-in-water emulsion for direct topical application, insofar as inhibition of bacterial growth in urinary urea lodging on the skin of the diaper region may be desired. These and other modifications may be made without departing from the spirit and scope of the invention as defined in the appended claim.

What is claimed is:

A diaper adapted for combating ammonia dermatitis having para di-isobutyl cresoxy ethoxy ethyl dimethyl benzyl ammonium chloride impregnated therein to inhibit the growth of *B. ammoniagenes*.

THOMAS J. MAHON.

References Cited in the file of this patent

UNITED STATES PATENTS

| Number | Name | Date |
|---|---|---|
| 2,115,250 | Bruson | Apr. 26, 1938 |
| 2,229,024 | Bruson | Jan. 21, 1941 |
| 2,271,378 | Searle | Jan. 27, 1942 |
| 2,282,181 | Guinzburg | May 5, 1942 |
| 2,423,262 | Sowa | July 1, 1947 |

OTHER REFERENCES

Rawlins et al.—Journal American Pharmaceutical Association, Scientific Edition, volume 32, pages 11 to 16 (1943).

Wood—"Tablet Manufacture," pages 152 to 154 (1906) J. B. Lippincott.

Hoogeride—Journal of Bacteriology, March 1945, pages 277 to 288.

Tablet Manufacture, J. B. Lippincott, 1906, Wood, pages 40–44.

Modern Drug Encyclopedia, New Modern Drugs, 1941, Gutman, 2nd Edition, pages 263 to 264.